May 28, 1968   V. BENATAR ETAL   3,385,595
HIGH SPEED FEEDER MECHANISM
Filed May 2, 1966   4 Sheets-Sheet 1

INVENTORS
VICTOR BENATAR
MICHAEL KATOGIR
BY *Walter M. Rodgers*
ATTORNEY

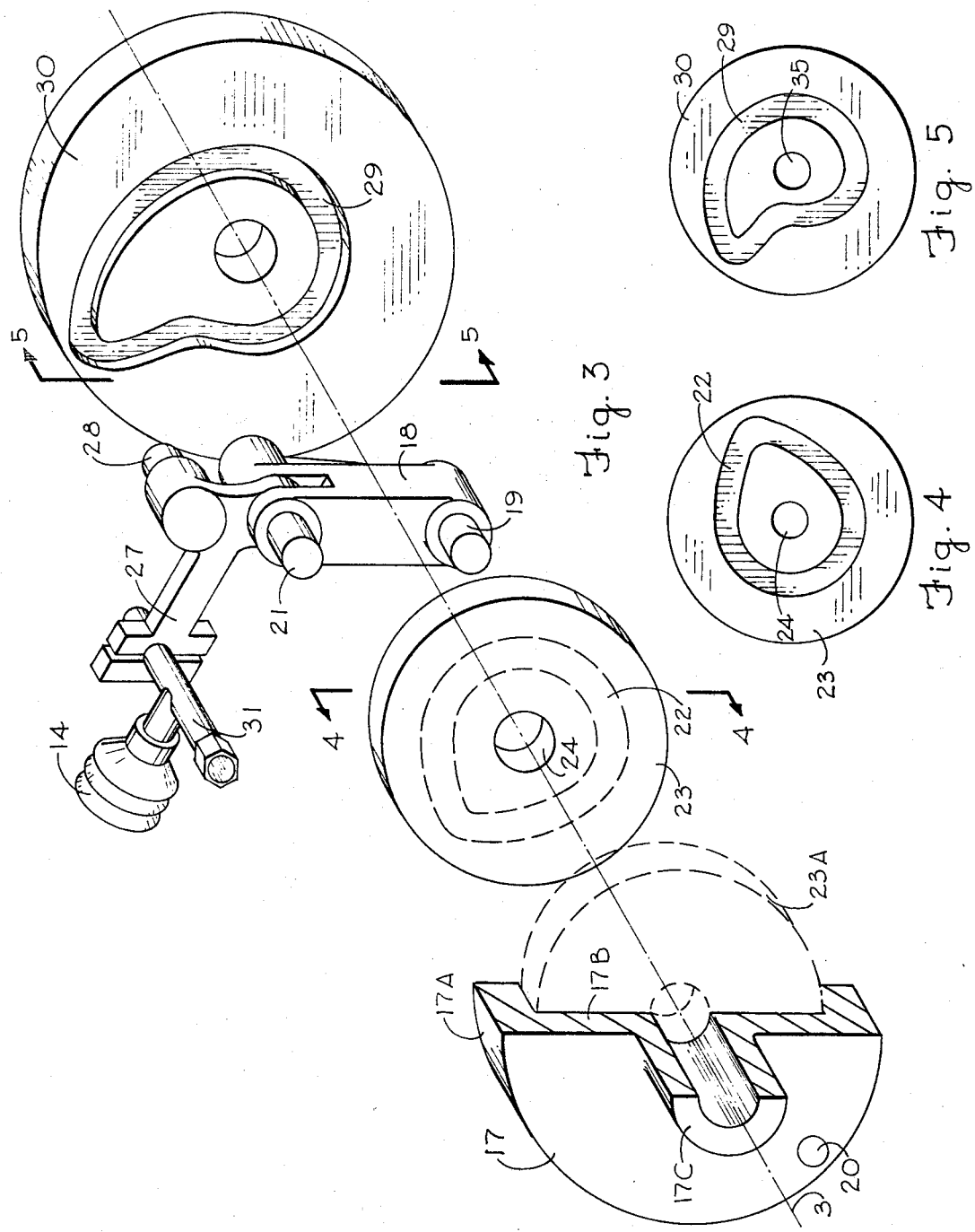

INVENTORS
VICTOR BENATAR
MICHAEL KATOGIR
BY: *Walter M. Rodgers*
ATTORNEY

May 28, 1968  V. BENATAR ET AL  3,385,595

HIGH SPEED FEEDER MECHANISM

Filed May 2, 1966  4 Sheets-Sheet 4

INVENTORS
VICTOR BENATAR
MICHAEL KATOGIR

BY: *Walter M. Rodgers*

ATTORNEY

United States Patent Office 3,385,595
Patented May 28, 1968

3,385,595
HIGH SPEED FEEDER MECHANISM
Victor Benatar and Michael Katogir, Atlanta, Ga.,
assignors to The Mead Corporation, a corporation of Ohio
Filed May 2, 1966, Ser. No. 546,827
7 Claims. (Cl. 271—27)

ABSTRACT OF THE DISCLOSURE

The mechanism as disclosed herein is primarily intended for use in withdrawing blanks from a hopper and for quickly depositing the blanks atop a group of items to be packaged. The mechanism is characterized by high speed of operation and utilizes pneumatic suction means for engaging the blanks. A high speed rotatable driving element is pivotally connected with a first driven element which in turn is provided with a cam follower arranged to ride in a cam surface formed in a fixed cam. A second driven element is pivotally connected with the first driven element and also is provided with a cam follower arranged to ride in a cam surface formed in a second fixed cam. A suction cup is mounted on and movable with the second driven element so that a composite motion is imparted thereto whereby the pneumatic suction means is arranged to engage a carton blank and quickly to withdraw it from its hopper and to deposit it atop a group of articles to be packaged.

Figure 1:
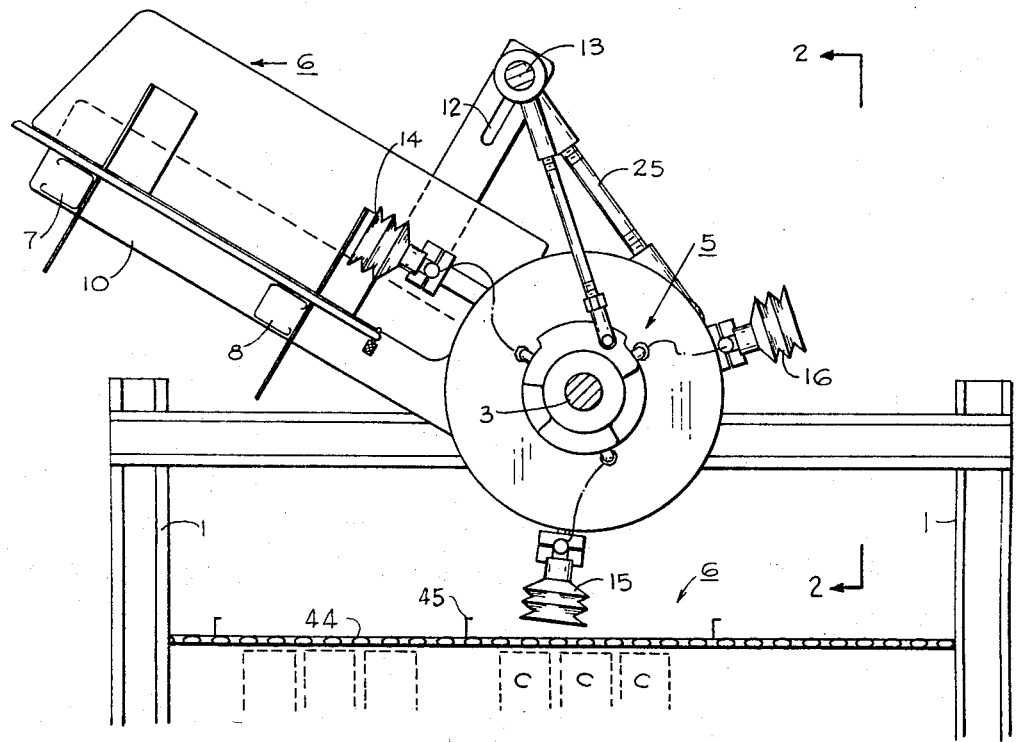

This invention relates to high speed feeder mechanisms and more particularly to a mechanism for withdrawing individual items such as carton blanks from a hopper and for then applying such items to a point of use in a high speed manner and wherein each increment of movement is positively controlled so as to adapt the mechanism for the efficient performance of a particular feeding operation.

The speed of packaging machines and of other similar machines wherein individual items such as carton blanks are fed from a hopper normally is limited by the speed with which the feeder mechanism can be made to operate. Where suction cups are employed to engage the item to be fed such as a carton blank, the suction cups should be moved through a path of movement such that the cup quickly approaches the item to be fed and dwells briefly upon contact therewith so as to establish a secure holding action. Thereafter the suction cup should be moved directly away from the hopper so as positively to withdraw the carton blank. Subsequently the motion of the suction cup should be such that the carton blank is smoothly fed to its point of use. If the point of use constitutes the location of a group of items to be packaged which in fact are moving at high speed, the movement of the carton blank should be synchronized as near as is possible with the movement of the item to be packaged.

A principal object of this invention is to provide an improved feeder mechanism which is adapted to provide motion which is controllable during each increment of movement thereof in such a way as to modify the path of circular movement imparted by a constant speed rotary driving element to change the radius, peripheral velocity and angular orientation of the feeder elements.

Another object of this invention is the provision of an improved feeder mechanism wherein the feeder element thereof is controlled in angular position and speed of movement both peripherally and radially by a composite action of at least two separate driven elements whose motion is derived from a common driving element.

A further object of the invention is to provide an improved rotary type feeder which is adaptable for tandem operation where a plurality of feeders work in synchronism with a single series of primary packages.

The invention in one form as applied to a feeder mechanism comprises a rotatable driving element arranged to move in a substantially circular path at substantially constant velocity, a first driven element pivotally interconnected with the driving element and provided with a cam follower adapted to cooperate with a continuous cam surface formed in a fixed cam adjacent the first driven element, a second driven element pivotally connected with the first driven element and on which the feeder device is mounted, the second driven element being provided with a cam follower which is arranged to cooperate with a continuous cam surface formed in a second fixed cam adjacent thereto. According to the invention, the two continuous cam surfaces and their associated cam followers and driven elements are arranged so as to impart a composite motion to the feeder device which is effective to impart movement thereto out of a circular path of movement in a radial direction and which also is effective to vary the peripheral velocity thereof as well as the angular orientation of the feeder device.

Figure 2:
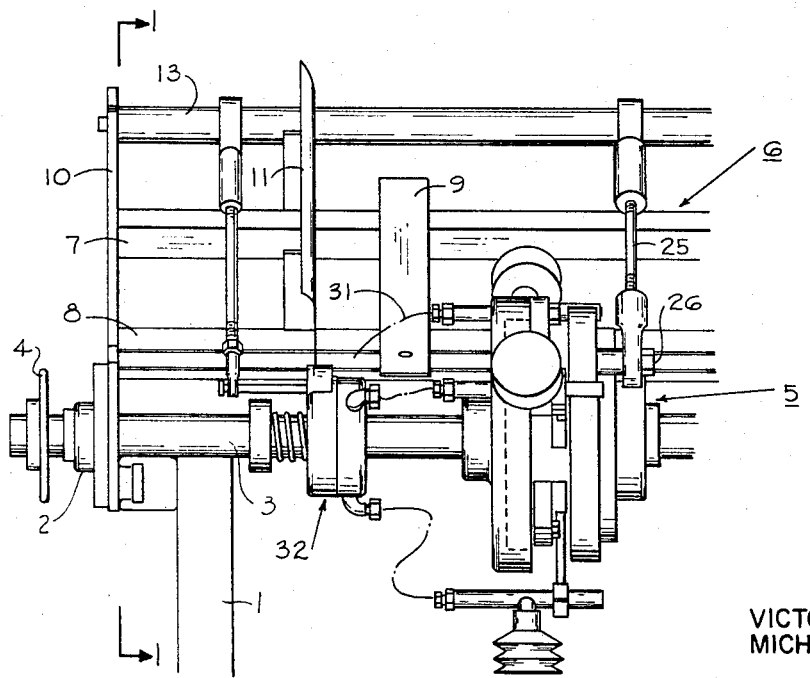
Figure 6:
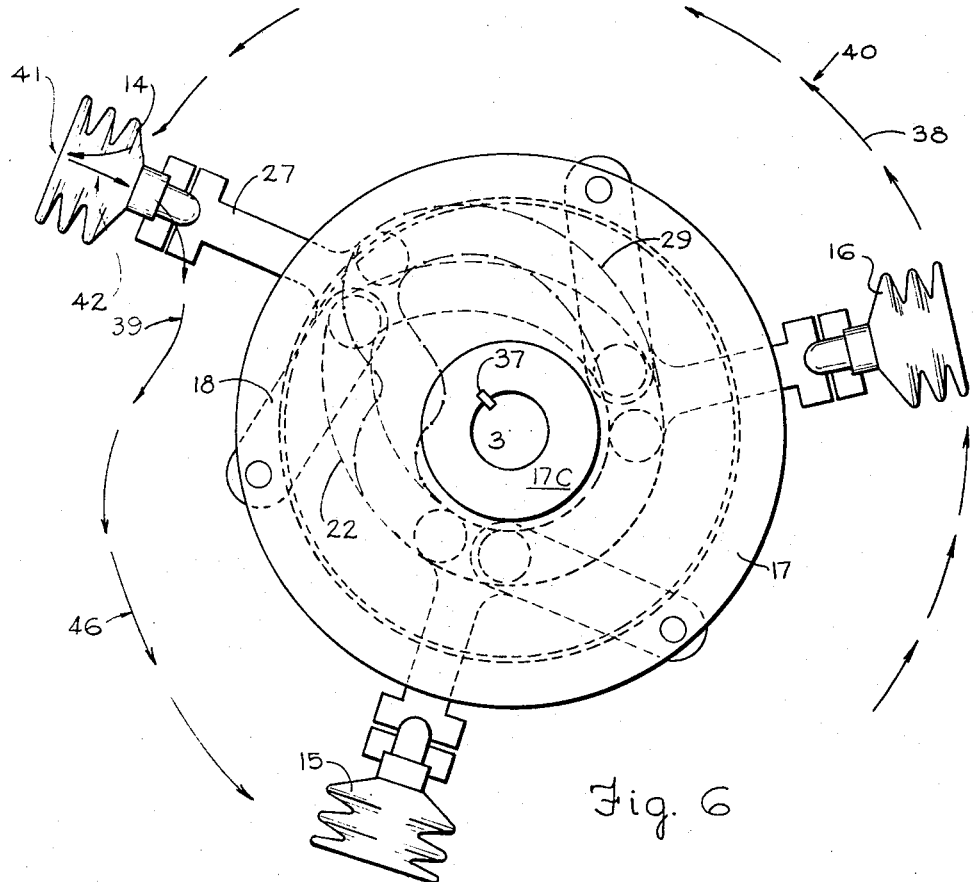
Figure 7:
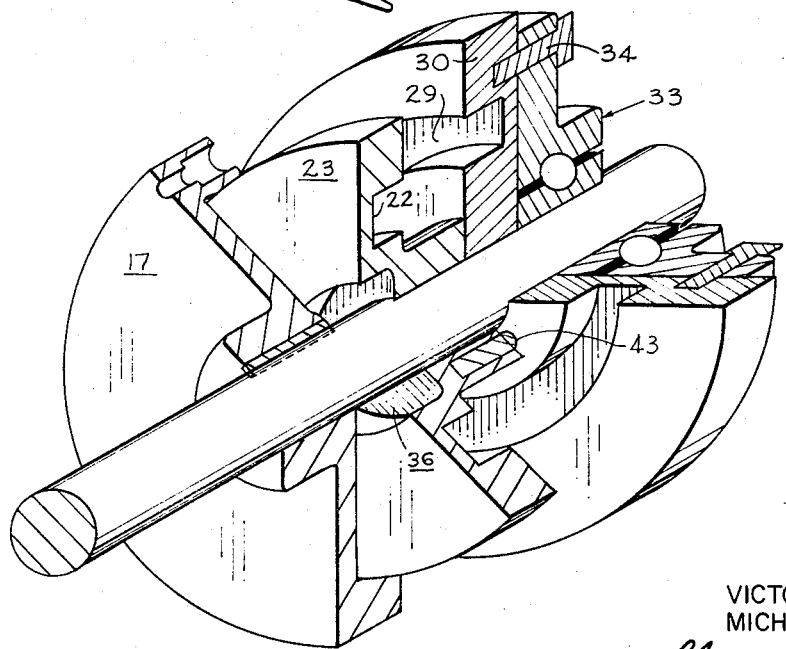
Figure 8:
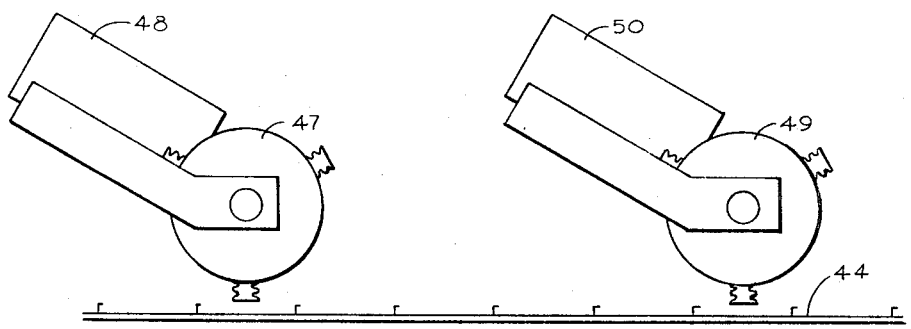

For a better understanding of the invention, reference may be had to the following detailed description taken in conjunction with the accompanying drawings in which FIG. 1 is a side view of a feeder mechanism embodying the invention; FIG. 2 is a front view as observed from the right hand side of FIG. 1; FIG. 3 is an exploded perspective view of certain elements which constitute essential features of the invention; FIGS. 4 and 5 are views taken along the lines designated 4—4 and 5—5 respectively in FIG. 3 and respectively show the faces of the two fixed cams which constitute essential elements of the inventions; FIG. 6 is a view taken from the approximate vantage point of FIG. 1 and showing the essential elements of the invention superimposed one on the other so as visually to interrelate the operations of the various elements; and in which FIG. 7 is a cutaway perspective view similar to FIG. 3 but which shows some of the essential parts in their assembled positions. FIG. 8 shows a schematic side view generally similar to FIG. 1 and depicts a tandem arrangement of two feeders operating in synchronism with a single feeder chain for a single series of primary packages.

With reference to the drawings, the numeral 1 designates the frame of the mechanism on which a pair of end bearings designated by the numeral 2 are mounted, only one such bearing being observable in FIG. 2. A main drive shaft 3 is rotatably mounted in bearings 2 and a drive sprocket 4 is affixed to one end of shaft 3. Mechanism constructed according to this invention is rotatable with and mounted in close proximity to the shaft 3 and in the drawing is generally designated by the numeral 5.

Carton blanks are supplied from a hopper structure generally designated by the numeral 6 by the mechanism 5 and are deposited at a point of use such as is designated generally by the letters C. The point of use may constitute a group of primary packages C which are to be packaged, for example, in a wrapper blank withdrawn from hopper 6 by the feeder mechanism 5 and deposited on a continuous chain 44 having lugs 45 thereon. Chain 44 is traveling in synchronism with cans C on a separate conveyor. The blanks are subsequently placed directly atop the packages C in known manner.

The hopper structure 6 is of conventional construction and may comprise a pair of transverse supports 7 and 8 on which a pair of base plates 9 are affixed. Transverse supports 7 and 8 preferably are secured at their ends to side plates 10 only one of which appears in the drawings. Mounted on opposite sides of the hopper 6 are a pair of upright side guides 11. A transverse rod 13 is affixed at its ends to the side plates 10 on which are mounted the top detents 12.

Feeder mechanism 5 may if desired be utilized to drive a plurality of feeder elements such as the suction cups 14, 15 and 16. As is well known the suction cups are supplied with vacuum pressure intermittently and preferably are of a bellows type construction so that when the bellows engages the flat surface of a carton blank suction pressure is effective to cause the carton blank to adhere to the suction cup and in this manner the lowermost carton is withdrawn from the hopper 6. When the bellows vacuum cup 14, 15 or 16 engages a blank in the hopper 6, the vacuum pressure tends to collapse and contract the bellows and thereby aids in withdrawing the carton from the hopper.

With reference to FIG. 3, the numeral 17 is used to designate a rotatable driving element fixedly mounted to the shaft 3 simply being eliminated from the drawing. The axis of shaft 3 is designated by the numeral 3 in FIG. 3 for the sake of clarity. Thus as driving motion is imparted to sprocket 4 shaft 3 and driving element 17 are rotated. A first driven element 18 is pivotally connected as by a pin 19 mounted on the first driven element 18 and an aperture 20 formed in driving element 17 so that rotation of driving element 17 imparts movement to driven element 18. Driven element 18 is provided with a cam follower 21 which cooperates with a continuous cam surface 22 formed in the fixed cam 23. Fixed cam 23 is provided with a central opening 24 through which the shaft 3 extends. In FIG. 3 the normal position of cam 23 is designated by the dotted lines designated generally at 23A. As is apparent from FIG. 3 the driving element 17 is provided with a peripheral flange 17A which defines a dished out recessed portion 17B in which the cam 23 is disposed.

Thus as driving element 17 rotates, motion is imparted to driven element 18 and its path of movement is modified by the continuous cam surface 22 due to the cooperation therewith of the cam follower 21.

The motion of driven element 18 is further modified by a second driven element 27 which is pivotally connected with the first driven element 18 by a pivot which constitutes a coaxial extension of the axis of cam follower 21. Second driven element 27 is provided with a cam follower 28 which rides in a continuous cam surface 29 formed in a second fixed cam 30. Fixed cam 30 is maintained in a fixed relationship by the rod 25, the bolt 26 and associated structure. Fixed cam 23 is held in fixed position by bolts 43 which rigidly interconnect the cams 23 and 30. The position of the cams relative to each other is critical to proper operation. Thus the location of bolts 43 must be precise.

Thus the second driven element 27 is moved as a result of a composite motion imparted thereto by the fixed cams 23 and 30 and their associated continuous cam surfaces in cooperation with the cam followers 21 and 28. By this means precise and positive control of the driven element 27 is achieved according to the invention.

Mounted on and movable with the driven element 27 is the feeder element 14 which preferably takes the form of a suction cup supplied with vacuum pressure intermittently through a hose connection 31. Feeder line 31 is interconnected with vacuum control mechanism generally designated at 32 and which may be of conventional construction. Needless to say the valve control mechanism 32 constitutes a fixed element and a rotatable element mounted on and rotatable with the shaft 3, the fixed element being interconnected with a vacuum source. Thus as the machine rotates, vacuum pressure is supplied intermittently to the suction cups 14, 15 and 16 in known manner.

A comparison of FIGS. 7 and 3 points up the physical orientation of the parts when assembled from their exploded condition as depicted in FIG. 3 to their normal positions of cooperative relationship as depicted in FIG. 7. In FIG. 7 the driven elements 18 and 27 have been removed for the sake of clarity and the bearing structure generally designated by the numeral 33 is shown as being affixed by bolt 34 to stationary cam 30. Of course the bearing structure 33 simply serves as a support for the fixed cam 30 and accomodates rotation of the shaft 3 disposed in the opening 35 formed in the fixed cam 30. A similar bearing structure is interposed between the fixed cam 23 and the cavity therefor is designated in FIG. 7 by the numeral 36.

The relationship between the continuous cam surfaces 22 and 29 is shown in FIG. 6. The continuous cam surface 22 is shown in FIG. 6 by conventional dashed lines while the continuous cam surface 29 is depicted in FIG. 6 by a composite dot dash line. In FIG. 6 the interconnection between the shaft 3 and the hub 17C of the driving element 17 is clearly shown and takes the form of a key 37.

FIG. 6 clearly shows that a plurality of suction cups such as 14, 15 and 16 may be employed. The driving and driven elements associated with each may use the same continuous cam surfaces. The cam followers simply ride in sequence one behind the other as the mechanism rotates, for example, in a counterclockwise direction as depicted in FIG. 6.

From FIG. 6 the path of movement imparted to the feeder element such as the suction cup 14 is depicted by the dotted line designated by the numeral 38. Thus the path of movement of the suction cup is approximately circular from the point designated approximately at 39 to that designated approximately at 40. Beginning at point 40 the suction cup 14 travels radially outward in a gradually increasing radius and advances angularly at a greater speed than the driving element 17. As the suction cup approaches the position depicted for cup 14, i.e., the point of contact with the items to be fed, the suction cup 14 dwells in a stationary position for a brief instance as depicted at position 41. Following the brief dwell during which the suction cup becomes securely affixed by vacuum to the adjacent carton blank, the suction cup is withdrawn radially inward with increasing acceleration for the path of travel designated at 42. Following the withdrawal of the carton blank, the motion of the suction cup such as 14 is smoothly and gradually accelerated angularly to a circular path beginning approximately at point 39 and continuing to point 46. During this period the angular velocity of the cup is greater than that of driving element 17. Of course the speed of movement of the suction cup 14 as it approaches its lowermost position can be adjusted to be substantially the same as the velocity of movement of paper feed chain which will carry the carton blank over the items to be packaged such as the cans C. At the lowermost position, the vacuum is released and the bellows vacuum cup 15 expands to a relaxed position firmly placing the carton blank against the paper feed chain 44 for a controlled transfer of the carton.

It is also evident that more than one such feeder mechanism may be easily placed in series over one paper feed chain. In this manner the speed of the overall system may be multiplied many times. For example as shown in FIG. 8 on feeder 47 and its hopper 48 may be placed in tandem with another rotary feeder 49 and its hopper 50. The speed of chain 44 is simply coordinated so that carton blanks are alternately deposited thereon by feeders 47 and 49. Such a tandem arrangement is feasible due in part to the rotary motion of the feeders which can be easily and precisely adapted to the speed and direction of travel of chain 44. In addition such a feeder does not incorporate linkages or other elements which offer obstructions to the movement of a blank deposited by another feeder.

While a particular embodiment of the invention has been shown and described, it will be understood that the invention is not limited thereto and it is intended in the appended claims to cover all such changes and modifica- The embodiments of the invention in which an exclusive property or privilege is claimed are defined as follows:

1. A feeder mechanism comprising a rotatable driving element arranged to move in a substantially circular path, a first driven element interconnected with said driving element and arranged to change position with respect thereto, a first cam fixed in position adjacent said first driven element and having a continuous cam surface, a first cam follower mounted on said first driven element and in engagement with said cam surface on said first cam, a second driven element interconnected with said first driven element and arranged to change position with respect thereto, a second cam fixed in position adjacent said second driven element and having a continuous cam surface, and a second cam follower mounted on said second driven element and in engagement with said cam surface on said second cam, said cam surfaces being configured to impart a composite motion to said second driven element.

2. A feeder mechanism according to claim 1, wherein said fixed cams are disposed on opposite sides of the plane in which said driven elements are movable.

3. A feeder mechanism according to claim 2 wherein said driving element is disposed adjacent one of said fixed cams and on a side thereof remote from said driven elements.

4. A feeder mechanism according to claim 1 wherein said driving element is pivotally connected with said first driven element.

5. A feeder mechanism according to claim 1 wherein said driven elements are pivotally interconnected.

6. A feeder mechanism according to claim 5 wherein the pivotal connection between said driven elements substantially coincides with the locus of said first cam follower.

7. A feeder mechanism according to claim 1 wherein said driving element is mounted on and movable with a drive shaft and wherein said fixed cams are provided with apertures through which said shaft extends.

References Cited

UNITED STATES PATENTS 1,980,527 11/1934 Hewton _____ 74—53
2,692,509 10/1954 Gibson _____ 74—53

RICHARD E. AEGERTER, *Primary Examiner.*